United States Patent Office 3,531,936
Patented Oct. 6, 1970

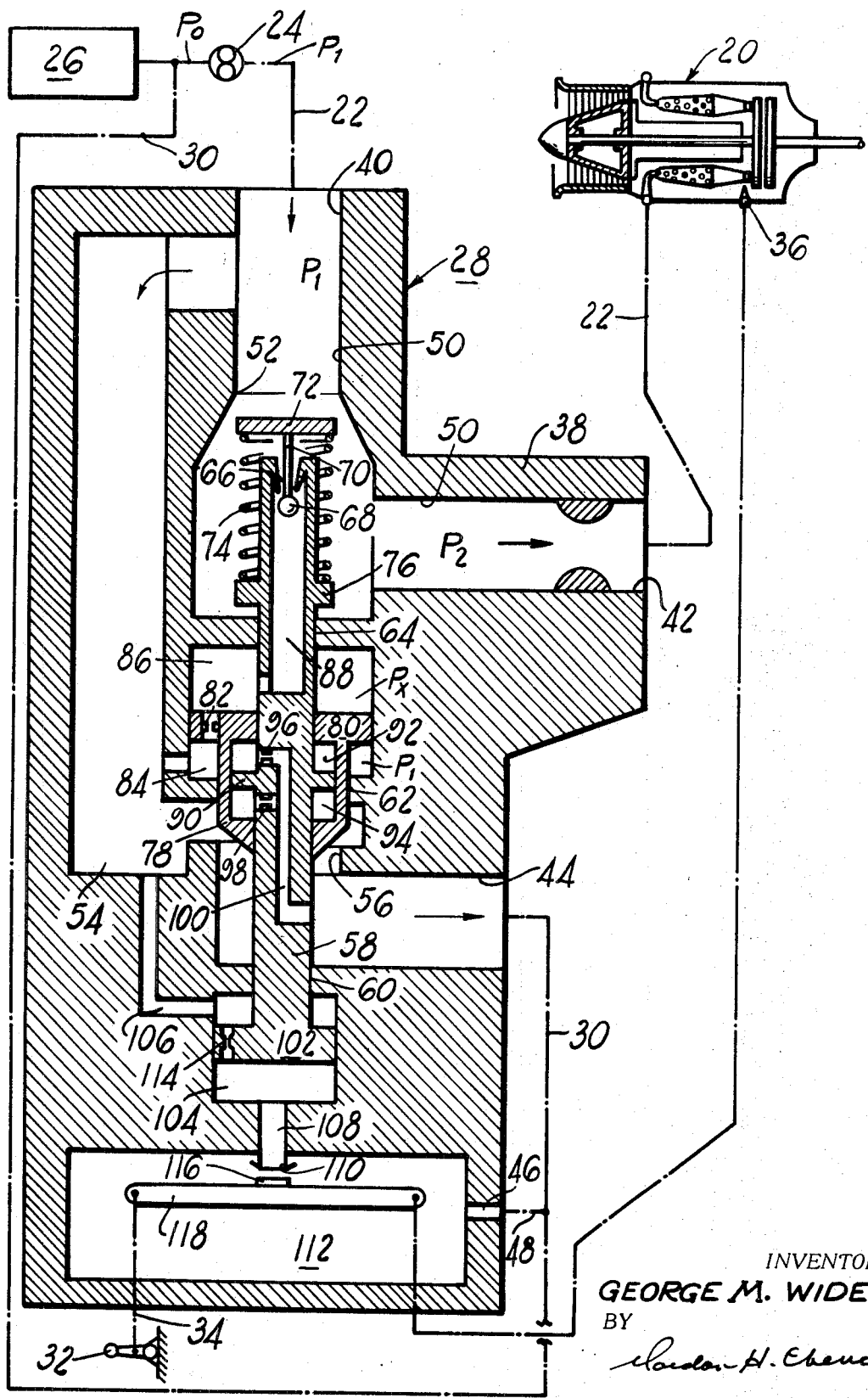

3,531,936
INTEGRATING FLUID METER WITH PHASE LEAD
George M. Widell, South Bend, Ind., assignor to The Bendix Corporation, a corporation of Delaware
Filed Dec. 20, 1968, Ser. No. 785,578
Int. Cl. F02c 9/08, 9/10; G05d 11/07
U.S. Cl. 60—39.28                    10 Claims

ABSTRACT OF THE DISCLOSURE

Fluid metering valve apparatus wherein a variable area orifice is controlled by a metering valve responsive to the fluid pressure drop across the orifice and loaded by a pressure drop regulating spring carried on a movable support actuated by an integrating piston responsive to a fluid servo pressure controlled as a function of a variable input signal which signal varies in accordance with the metered fluid flow. The fluid pressure drop across the orifice is controlled to a constant value by a piston actuated bypass valve slidably carried on the support and responsive to a fluid pressure differential controlled by a servo valve fixed to the metering valve and movable therewith. A fluid dashpot connected to the bypass valve and support piston temporarily overrides the bypass valve actuating piston permitting simultaneous movement of the support and bypass valve to vary the pressure drop across the orifice in phase lead relationship to movement of the metering valve which together with the servo valve attached thereto, as the variable input signal deteriorates to zero, assumes a stable position permitting the fluid pressure differential actuated piston to overcome the dashpot thereby regulating the fluid pressure drop across the orifice to the constant value.

BACKGROUND OF THE INVENTION

The present invention concerns fluid metering apparatus particularly of the type utilized for controlling fuel to a combustion engine as a function of an error between a reference signal and an engine generated signal which varies depending upon the flow of metered fuel to the engine.

Prior art fuel metering apparatus utilizing a variable area metering valve across which a constant or variable fluid pressure differential is maintained by a fuel bypass valve is well known and various control circuitry adapted for use therewith to provide integrating and/or phase lead operation are known. However, particularly in the case of hydro-mechanical fuel metering apparatus, the control components which may include a plurality of valves, pistons, diaphragms, levers and the like resulting in a somewhat complex, weighty and/or bulky package which, under certain operating environments such as in aircraft, is undesirable and in some cases cannot be tolerated. Furthermore, since reliability and/or accuracy of such control apparatus may suffer by virtue of the system complexity, it will be recognized that maximum simplicity is desirable.

It is therefore an object of the present invention to provide compact and reliable fluid flow control valve means having integrating and phase lead control functions in response to an error input signal.

It is another object of the present invention to provide fuel flow control apparatus including a combined variable area metering valve and bypass valve for controlling the fuel pressure differential across the metering valve and control means of the integrating with phase lead type responsive to an input signal for controlling said valves.

Other objects and advantages of the present invention will be apparent from the following description taken with the accompanying drawings.

BRIEF DESCRIPTION OF THE DRAWING

The drawing represents a schematic illustration in section of a combustion engine and fuel control system therefor embodying the present invention.

DESCRIPTION OF THE PREFERRED EMBODIMENT

Referring to the drawing, numeral 20 represents a conventional combustion engine which may take the form of a gas turbine engine adapted to receive a flow of metered fuel via a fuel supply conduit 22 connected to unmetered fuel at pressure $P_1$ from the output of an engine driven fuel pump 24 having its inlet connected to a source of fuel 26 at pressure $P_0$.

A fuel meter 28 embodying the present invention is connected to conduit 22 in flow controlling relationship with the fuel at pressure $P_1$ supplied thereto from pump 24. A drain passage 30 connects the interior of fuel meter 28 to conduit 22 at relatively low pump inlet pressure $P_0$.

A reference input signal imposed on fuel meter 28 may be generated by any suitable control means such as a variable position control lever 32 suitably connected to fuel meter 28 via linkage means 34.

A variable input signal representative of an engine operating condition which may include engine speed or an engine generated temperature or pressure which varies depending upon the amount of metered fuel flow delivered to the engine is imposed on fuel meter 28 and generated by suitable conventional sensing means generally indicated by 36.

The fuel meter 28 includes a casing 38 having an inlet port 40 and an outlet port 42 connected to conduit 22 and a fuel bypass port 44 connected via passage 30 to conduit 22 at pump inlet pressure $P_0$. A drain port 46 and passage 48 vents the interior of casing to drain passage 30.

Inlet and outlet ports 40 and 42, respectively, are connected by a conduit 50 having a metering orifice 52 in flow controlling relationship therewith. A fuel bypass conduit 54 connects conduit 50 upstream from metering orifice 52 with port 44 and includes a variable area bypass orifice 56.

An elongated circular member 58 extends through wall portions 60, 62 and 64 of casing 38 and is slidably carried thereby for axial movement. One end of circular member 58 is provided with a valve orifice 66 having a flapper 68 movable relative thereto. A stem 70 fixedly secured at one end to flapper 68 extends through orifice 66 and is fixedly secured at its opposite end to a disc-like metering valve member 72 which is adapted to move toward or away from metering orifice 52 to vary the effective flow area thereof according to the position of valve member 72. A compression spring 74 interposed between valve member 72 and a spring retaining flange 76 on circular member 58 urges valve member 72 toward metering orifice 52 in opposition to the pressure differential $P_1$–$P_2$ generated thereacross.

A fuel bypass valve 78 slidably mounted on circular member 58 is provided with a differential area piston portion 80 slidably carried in casing 38 and provided with a flow restriction 82 communicating opposite faces thereof. The one side of piston 80 is exposed to pressure $P_1$ in a chamber 84 vented to bypass conduit 54 upstream from bypass valve 78 and the opposite relatively larger area side thereof is exposed to a controlled servo pressure $P_x$ in a chamber 86. The chamber 86 is vented via a discharge passage 88 connected to valve orifice 66 which, in turn, is adapted to vent passage 88 to pressure $P_2$ downstream from metering orifice 52 to a degree determined by the position of flapper 68 relative to orifice 66 thereby controlling pressure $P_x$ accordingly.

The bypass valve 78 is chambered to slidably receive an annular wall portion 90 integral with circular member 58. Variable volume chambers 92 and 94 partially defined by wall portion 90 separating the same are vented to relatively low pressure $P_0$ downstream from bypass valve 78 via restricted ports 96 and 98, respectively, and passage 100 in circular member 58.

The circular member 58 is provided with an integral differential area piston portion 102 fixedly secured to one end thereof and slidably carried in a chamber 104 in casing 38. An inlet passage 106 connects bypass conduit 54 at pressure $P_1$ to chamber 104 on one side of piston portion 102 and an outlet passage 108 connects chamber 104 on the relatively larger area side of piston portion 102 to a valve orifice 110 which, in turn, communicates with a chamber 112 vented via port 46 and passage 48 to passage 30 at relatively low pump inlet pressure $P_0$. A flow restriction 114 in piston portion 102 provides a fluid path between opposite faces of piston portion 102 across which a variable control pressure differential is generated as a result of the effective flow area of orifice 110 established by a flapper 116. The flapper is carried by a tiltable lever 118 disposed in chamber 112 and actuated by an input position signal applied to one end thereof as a function of the position of control lever and/or by an input position signal applied to the opposite end thereof as a function of the variable signal derived from sensing means 36.

OPERATION

It will be assumed that the various component members occupy a stable position in response to a given position of flapper 116. A predetermined rate of fuel passes through metering orifice 52 having an effective flow area defined by the position of metering valve member 72 relative thereto. A constant predetermined pressure drop $P_1-P_2$ is maintained across metering orifice 52 and valve member 72 by bypass valve 78 which is stabilized in response to pressure $P_x$ acting against its corresponding face of piston 80 and opposing pressure $P_1$ acting against its corresponding face of piston 80 in combination with pressure $P_0$ acting against the effective end area of bypass valve 78 exposed thereto.

Now, it will be assumed that the control lever 32 is actuated in a direction dictating an increase in fuel which results in a corresponding clockwise tilting movement of lever 118 as viewed in the drawing. The flapper 116 moves toward orifice 110 decreasing the area of the same which, in turn, produces a decrease in pressure differential across piston 102 which, in turn, drives circular member 58 as well as metering valve 72 carried thereby toward metering orifice 52.

As piston 102 drives circular member 58, the bypass valve 78 moves with circular member 58 by virtue of the dashpot action of port 96 restricting flow out of chamber 92 thereby overcoming the resistance of pressure $P_x$ acting against piston 80 which, in turn, results in an increase in area of bypass orifice 56 and thus flow diverted therethrough. The bypass valve 78 is contoured to provide a higher flow versus position gain relationship compared to metering valve 72. The metering valve 72 movement toward metering orifice 52 and the resulting decrease in effective flow area of metering orifice 52 causes a corresponding decrease in pressure $P_2$ downstream therefrom and thus an increase in pressure drop $P_1-P_2$ thereacross. However, the greater gain characteristic of bypass valve 78 causes a simultaneous reduction in pressure $P_1$ which, in turn, reduces the pressure drop $P_1-P_2$ across metering valve 78 causing a further reduction in metered flow in addition to that resulting from the progressively decreasing area established by metering valve 78. It will be noted that the bypass valve 78 provides a phase lead action in that variations in the pressure drop $P_1-P_2$ controlled thereby, depending upon the gain characteristic of bypass valve 78 relative to variations in area of metering orifice 52 produced by metering valve 78, result in a corresponding decrease in metered flow which exceeds that resulting from the decrease in metering area caused by metering valve 78.

The decrease in metered fuel flow to engine 20 and subsequent effect on the engine operation condition sensed by sensing means 36 is transmitted as an input to the one end of lever 118 which pivots in a clockwise direction about the opposite end thereof as viewed in the drawing causing flapper 116 to move away from orifice 110 thereby decreasing the pressure downstream from restriction 114 accordingly as a function of the decreasing error signal imposed on lever 118.

It will be recognized that the piston 102 is integrating in action in that its velocity and thus net change in position as a function of time is a function of the error signal imposed on lever 118. The piston is stabilized in response to a predetermined fixed ratio between pressures thereacross which ratio is established by the fixed area ratio of opposite sides of piston 102. Regardless of variations in the pressure $P_1$ upstream of restriction 114, the piston 102 becomes stabilized when the position of flapper 116 establishes a pressure $P_2$ which satisfies the required ratio relationship between pressure $P_1$ and the pressure downstream from restriction 114.

As the error signal diminishes to zero, the movement of metering valve 78 and thus flow area of metering orifice 52 is reduced accordingly. The flapper 68 attached to metering valve 78 being unbalanced in a direction to close orifice 66 as a result of the pressure differential generated across metering valve 78 in opposition to the spring 74 causes an increase in $P_x$ in chamber 86. The resulting pressure drop $P_1-P_x$ across piston 80 which, like piston 102 heretofore described, is integrating in action by virtue of the fixed area ratio of opposite sides of piston 80 which requires a corresponding ratio of pressures $P_1$ and $P_x$ for stabilization thereof slowly overcomes the resistance generated by dashpot restriction 98 through which chamber 94 discharges to relatively low pressure $P_0$. As the bypass valve 78 moves in a closing direction the pressure $P_1$ upstream from metering valve 78 increases accordingly to increase the pressure drop $P_1-P_2$ across metering valve 78 which, in turn, is urged against the resistance of spring 74 causing flapper 68 to move relative to orifice 66. The resulting decrease in pressure $P_x$ in chamber 86 establishes the required ratio of pressures $P_1$ and $P_x$ across piston 80 to stabilize the same and establish the predetermined constant pressure differential $P_1-P_2$ across metering valve 78.

It will be understood that the above described sequence of operation would be reversed in the event that the control lever 32 is actuated to impose an error input signal to lever 118 causing the same to tilt in a counterclockwise direction thereby opening flapper 116.

It is considered within ordinary engineering skill to install suitable conventional fluid seals where necessary to seal one fuel pressure from another and to provide access openings in the casing 38 where required to permit installation or removal of the internal structure shown and described.

I claim:
1. Fluid flow control apparatus comprising:
   a conduit connecting a pressurized source of fluid with a receiver;
   first valve means operatively connected to said conduit for controlling the effective flow area thereof;
   second valve means operatively connected to said conduit for controlling the fluid pressure drop across said first valve means at a predetermined constant value;
   actuating means including pressure drop responsive means operatively connected to said second valve means for controlling the position of the same and thus the fluid pressure drop across said first valve means;

control means responsive to an input control signal and operatively connected to said first valve means for actuating the same to vary the flow controlling position thereof as a function of said input control signal; and means operatively connecting said second valve means and said control means for temporarily restricting movement of said second valve means in response to said actuating means such that said second valve means moves in unison with said first valve means as a function of said input control signal;

said first and second valve means being operable in response to a variation in said input control signal to cause a simultaneous variation in effective flow area of said conduit and fluid pressure drop across said first valve means, respectively, wherein the variation in fluid pressure drop is in phase lead relationship with said variation in effective flow area of said conduit;

said actuating means being operative to subsequently overcome said means for restricting movement of said second valve means and control said second valve means to reestablish said predetermined constant pressure drop across said first valve means.

2. Fluid flow control apparatus as claimed in claim 1 wherein:
the rate of change of position of said first and second valve means in response to said actuating means varies depending upon the degree of variation of said input signal.

3. Fluid flow control apparatus as claimed in claim 1 wherein:
said control means includes a differential area piston responsive to a control fluid pressure drop across a fluid restriction; and
valve means responsive to said input control signal for controlling the pressure drop across said fluid restriction.

4. Fluid flow control apparatus as claimed in claim 3 wherein:
said control means further includes a support member connected to and actuated by said piston;
said first and second valve means being mounted on said support member for movement therewith; and
said means for temporarily restricting movement of said second valve means includes fluid dashpot means operatively connecting said second valve means and said support member for resisting relative movement therebetween.

5. Fluid flow control apparatus as claimed in claim 1 wherein:
said control means includes a movable support member having a differential area piston responsive to a controlled fluid pressure differential and valve means responsive to said input control signal for controlling said fluid pressure differential;
said first valve means includes a fluid pressure differential responsive valve member and resilient force producing means interposed between said support member and said valve member for actuating said valve member in response to movement of said support member to vary the effective flown area of said conduit;
said valve member being responsive to the fluid pressure differential thereacross to generate a corresponding force opposing said resilient force producing means;
said second valve means includes a bypass valve slidably carried on said support member for diverting fluid from said conduit upstream from said first valve means to a relatively lower pressure fluid source to vary the fluid pressure upstream from said first valve means and thus the fluid pressure drop thereacross accordingly, a differential area piston operatively connected to said bypass valve and responsive to a controlled fluid pressure differential imposed thereon, and valve means connected to and actuated by said pressure differential responsive valve member for controlling the fluid pressure differential imposed on said last named differential area piston; and said means operatively connecting said second valve means and said control means includes a pair of fluid chambers defined by said support member and said bypass valve, and fluid flow restricting means connected to each of said chambers for restricting fluid flow outwardly therefrom in response to pressurization of said differential area piston controlling said bypass valve.

6. Fluid flow control apparatus as claimed in claim 1 and adapted for use in controlling fluid flow to a combustion engine wherein:
said pressurized source of fluid is fuel and said receiver is a fuel combustion chamber; and
said input control signal is an error signal derived from a positionable member establishing a reference position signal and a positionable member responsive to a condition of engine operation which varies in response to the metered flow of fuel to said combustion chamber.

7. Fluid flow control apparatus as claimed in claim 1 wherein:
said conduit is defined by a casing having an inlet port connected to receive said pressurized fluid, a first outlet port connected to supply metered fluid to said receiver and a second outlet port connected to divert excess fluid to a relatively low pressure source of fluid compared to said first moved source;
said first valve means includes an orifice in series flow relationship with said inlet and first outlet ports and a first valve member movable relative to said orifice for varying the effective flow area thereof;
said second valve means includes a second orifice in series flow relationship with said inlet and said second outlet ports for diverting fluid from said conduit upstream from said first valve means and a second valve member movable relative to said second orifice for varying the effective flow area thereof.

8. Fluid flow control apparatus as claimed in claim 7 wherein:
said control means includes a fluid pressure responsive piston, a passage having a fluid restriction therein connected in parallel flow relationship with said second orifice, a servo valve operatively connected to said passage for controlling the fluid pressure drop across said restriction in response to said input control signal, and a shaft integral with said piston and slidably carried by said casing;
said first and second valve member being operatively connected to said shaft and actuated thereby;
said second valve member being movable relative to said shaft in response to said actuating means.

9. Fluid flow control apparatus as claimed in claim 1 wherein:
said control means includes a movable support member having fluid pressure responsive means operatively connected thereto for actuating the same and valve means responsive to said input control signal for controlling said fluid pressure;
said first valve means includes a fluid pressure differential responsive valve member and resilient force producing means interposed between said support member and said valve member for actuating said valve member in response to movement of said support member to vary the effective flow area of said conduit;
said valve member being responsive to the fluid pressure drop thereacross to generate a corresponding force opposing said resilient force producing means.

10. Fluid flow control apparatus as claimed in claim 5 wherein:

said second valve means includes a bypass valve operatively connected to said support member for diverting fluid from said conduit upstream from said first valve means to a relatively lower pressure fluid source to vary the fluid pressure upstream from said first valve means and thus the fluid pressure drop thereacross accordingly, fluid pressure responsive means operatively connected to said bypass valve for actuating the same relative to said support member and valve means connected to and actuated by said fluid pressure differential responsive valve member for controlling the fluid pressure to which said last named pressure responsive means responds.

References Cited

UNITED STATES PATENTS

| | | | |
|---|---|---|---|
| 2,690,190 | 9/1954 | Farrell | 137—115 |
| 2,952,267 | 9/1960 | Reis | 137—115 |
| 3,106,934 | 10/1963 | Rogers | 60—39.28 |
| 3,367,354 | 2/1968 | Gallant | 137—115 |
| 3,399,529 | 9/1968 | Lawrence | 60—39.28 |

MARK M. NEWMAN, Primary Examiner

U.S. Cl. X.R.

137—115, 117